Figures 1, 2:
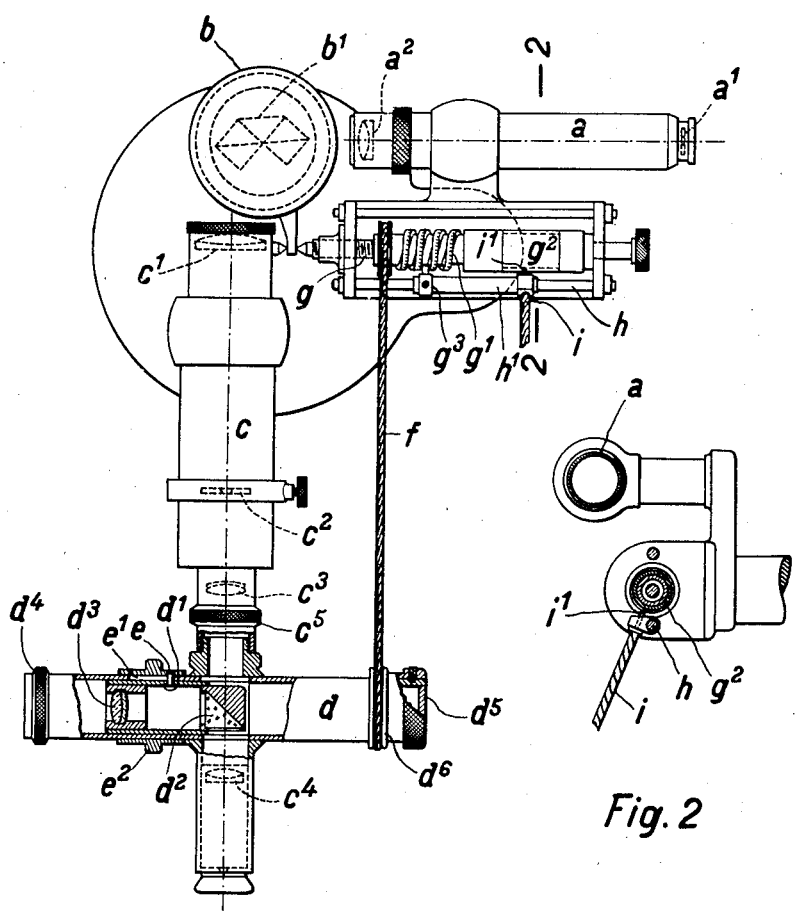

Patented May 5, 1936

2,039,355

UNITED STATES PATENT OFFICE 2,039,355

SPECTROSCOPIC MONOCHROMATOR

Armin Tschermak-Seysenegg, Prague, Czechoslovakia, assignor to the firm Carl Zeiss, Jena, Germany Application June 29, 1934, Serial No. 733,150
In Germany July 5, 1933

4 Claims. (Cl. 88—14)

I have filed an application in Germany, July 5, 1933 of which the following is a specification:

The present invention concerns spectrum apparatus producing a monochromatically illuminated field and in which this field is viewed by means of an eye-piece. According to the invention, apparatus of this kind are equipped with a device having a reflecting surface and permitting to temporarily cover the illuminated field and to view another field by means of the eye-piece and the reflecting surface, this other field being illuminated by a source of light at one side of the observation tube. This construction offers the advantage of a very convenient examination of the chromatic neutrality of any source of light. The examination, which may be used, for instance, for finding suitable filters for so-called day-light lamps, for making purely white colors and the like, consists in this that a comparison color is made to act during a certain time upon the rested neutralized eye and, then, upon the same eye subsequently to this eye having been influenced by the source of light to be examined. This source of light is chromatically neutralized when one and the same shade of the comparison color appears both times. Not only does the device according to the invention provide a possibility to easily make any suitable comparison colors and to compare these colors in rapid succession to the light to be examined, but it permits to effect an exact measurement at the same time.

The device according to the invention may be so constructed that a transparent plano-parallel glass plate is disposed in the ray path of the eye-piece and inclined at 45° relatively to the optical axis, this glass plate being traversed by the rays emanating from the monochromatically illuminated field and reflecting in the direction of the optical axis of the observation tube the rays that emanate from the lateral luminous field. With a view to ensuring alternate observations of the two luminous fields, it is necessary in this case to provide stops in the ray paths of the said fields.

It is more convenient to provide a reflector which may be displaced transversely to the axis of the observation tube. When this reflector is made to represent a stop, for instance by providing a layer of an opaque material on its rear side, or when a totally reflecting prism is used instead of this reflector, it is not necessary to provide stops between the reflecting surface and the luminous fields, since the displacements of the reflector provide an alternate visibility of the luminous fields.

To attain that one person may numerically determinate the rsesults of his measurements in the dark, it is advisable to connect an appliance indicating the wave-lengths of definite color adjustments to the device for measurably altering the color of the monochromatically illuminated field, which device is generally applied in connection with spectrum apparatus of this kind.

In the accompanying drawing, which illustrates a constructional example of the invention, Figure 1 is a part-sectional top view of the apparatus, and Figure 2 represents a section through the line 2—2 in Figure 1.

The spectrum apparatus represented in the drawing comprises a tube $a$ which is provided with a slit $a^1$ and an objective $a^2$, a housing $b$ which has a dispersing prism system $b^1$, and an observation tube $c$ having an objective $c^1$, a slit $c^2$ of variable breadth and an eye-piece that consists of a field lens $c^3$ and an eye lens $c^4$. Between the lenses $c^3$ and $c^4$ is disposed an iris diaphragm $c^5$. Between these lenses, the wall of the eye-piece tube has an aperture in which a transverse tube $d$ is provided. In that end of the tude $d$ which faces the eye-piece is disposed a displaceable tube $d^1$ having a totally reflecting prism $d^2$ and a lens $d^3$. The tube $d$ has also an iris diaphragm $d^4$. A pin $e$, which is guided by a slit $e^1$, prevents the tube $d^1$ from rotating and connects this tube to an exterior tube $e^2$. At the other end of the eye-piece, the tube $d$ is provided with a cover $d^5$ and has a rotatable reel $d^6$. A rope $f$ connects this reel to a square threaded screw $g$ which is to adjust the prism system $b^1$, the screw $g$ being rigidly connected to a triangular threaded screw $g^1$ which represents a wave-length scale and to a drum $g^2$ provided with a sheet of paper with a wave-length scale. The threads of the screw $g^1$ are in mesh with an index $g^3$ displaceable on a rod $h$ and connected by means of a sleeve $h^1$ to a plotting pencil $i^1$ operated by a releasing rope $i$.

The apparatus is operated as follows:

When the slit $a^1$ is illuminated in the usual manner, the source of light whose chromatic neutrality is to be examined is so adjusted as to illuminate the aperture of the diaphragm $d^4$. The tube $d^1$ with the prism $d^2$ and the lens $d^3$ is displaced from the position represented in the drawing to the extreme left, as a consequence of which the prism $d^2$ is not in the ray path of the observation tube $c$ any longer and the illumination field of the spectrum apparatus appears in the eye-piece of this tube. Thereupon the reel $d^6$ and the measuring screw $g$ are so operated as to make the rested eye which is not influenced chromatically see a corresponding color, for instance that color which appears to the eye as a pure and not as a reddish or greenish yellow. The adjustment of the measuring screw $g$ is marked by means of the releasing rope $i$ and the pencil $i^1$ on the sheet of paper. The tube $d^1$ is now made to reassume the position represented in the drawing and the luminous field produced by the lamp to be examined is viewed a certain time through the eye-piece cup. The tube $d^1$ is again displaced to the left, pure yellow is again adjusted in the field of view of the spectrum apparatus, and the position is marked on the paper by means of the pencil $i^1$. The marks on the paper will coincide when the source of light emits neutral light, that is to say when the eye is not chromatically influenced by the observation of the light to be examined. When the marks appear at different places, the magnitude of the difference provides a measure for the degree of the chromatic influence of the light to be examined on the observer, and there may be determined what filter is eventually required for obtaining a chromatically neutral light by means of the lamp to be examined. Judging the chromatical neutrality of a lamp is effected by means of the spectrum apparatus most conveniently when three definite colors (the so-called primary colors) are used, namely those which appear to the eye as a pure yellow, a pure green and a pure blue.

I claim:

1. A spectroscopic monochromator, comprising a slit tube, an observation tube, a dispersing prism system disposed between these tubes, the said observation tube having an eye-lens for the observation of light rays coming from the prism system, a lateral aperture, a reflector slidably mounted on the observation tube so as to be moved into and out of the path of the light rays coming from the dispersing prism, this reflector being adapted to direct into the ray path of the eye-lens light rays coming from the said aperture, and means for sliding said reflector into and out of the path of the light rays from that prism system so that when the reflector is positioned in said path, the light rays from the prism system will be invisible to an observer viewing the light rays from that aperture and when the reflector is positioned out of said path, the light rays coming from said aperture will be invisible to a person viewing the light rays coming from the prism system.

2. A spectroscopic monochromator, comprising a slit tube, an observation tube, a dispersing prism system disposed between these tubes, the said observation tube having an eye-lens for the observation of light rays coming from the prism system, a lateral aperture, a reflector slidably mounted on the observation tube so as to be moved into and out of the path of the light rays coming from the dispersing prism, this reflector being adapted to direct into the ray path of the eye-lens light rays coming from the said aperture, means for sliding said reflector into and out of the path of the light rays from said prism system so that when the reflector is positioned in said path, the light rays from the prism system will be invisible to an observer viewing the light rays from the said aperture and when the reflector is positioned out of said path, the light rays coming from said aperture will be invisible to a person viewing the light rays coming from the prism system, a device for adjusting the said prism system and the said observation tube relatively to each other, this device being adapted to vary the color of the monochromatically illuminated field, and a plotting device consisting of a writing surface and a plotting pencil, the writing surface being coupled to the said device for reciprocally adjusting the prism system and the observation tube.

3. A spectroscopic monochromator, comprising a slit tube, an observation tube, a dispersing prism system disposed between these tubes, the said observation tube having an eye-lens for the observation of light rays coming from the prism system, a lateral aperture, and an opaque reflector displaceable transversely to the axis of the observation tube and having two extreme positions, this reflector, when assuming the one extreme position, lying on the object side of the said eye-lens and transversely to the path of the imaging rays which come from the prism system and being adapted to direct to the eye-lens the light rays coming from the said aperture and to stop down the light rays coming from the prism system and, when assuming the other extreme position, lying outside the path of the imaging rays of the observation tube and stopping down the light rays coming from the said aperture.

4. A spectroscopic monochromator, comprising a slit tube, an observation tube, a dispersing prism system disposed between these tubes, the said observation tube having an eye-lens for the observation of light rays coming from the prism system, a lateral aperture, an opaque reflector displaceable transversely to the axis of the observation tube and having two extreme positions, this reflector, when assuming the one extreme position, lying on the object side of the said eye-lens and transversely to the path of the imaging rays which come from the prism system and being adapted to direct to the eye-lens the light rays coming from the said aperture and to stop down the light rays coming from the prism system and, when assuming the other extreme position, lying outside the path of the imaging rays of the observation tube and stopping down the light rays coming from the said aperture, a device for adjusting the said prism system and the said observation tube relatively to each other, this device being adapted to vary the color of the monochromatically illuminated field, and a plotting device consisting of a writing surface and a plotting pencil, the writing surface being coupled to the said device for reciprocally adjusting the prism system and the observation tube.

ARMIN TSCHERMAK-SEYSENEGG.